UNITED STATES PATENT OFFICE.

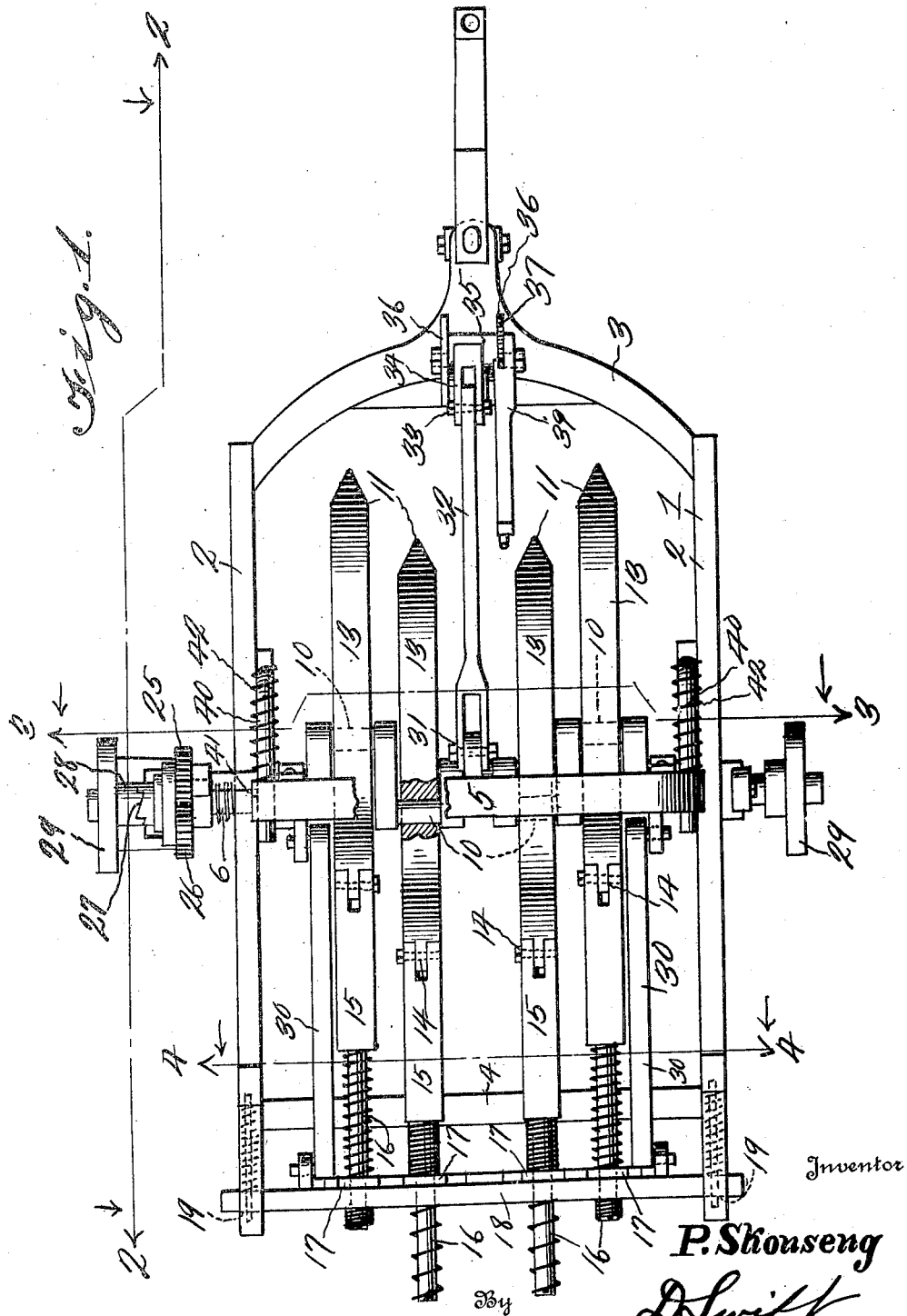

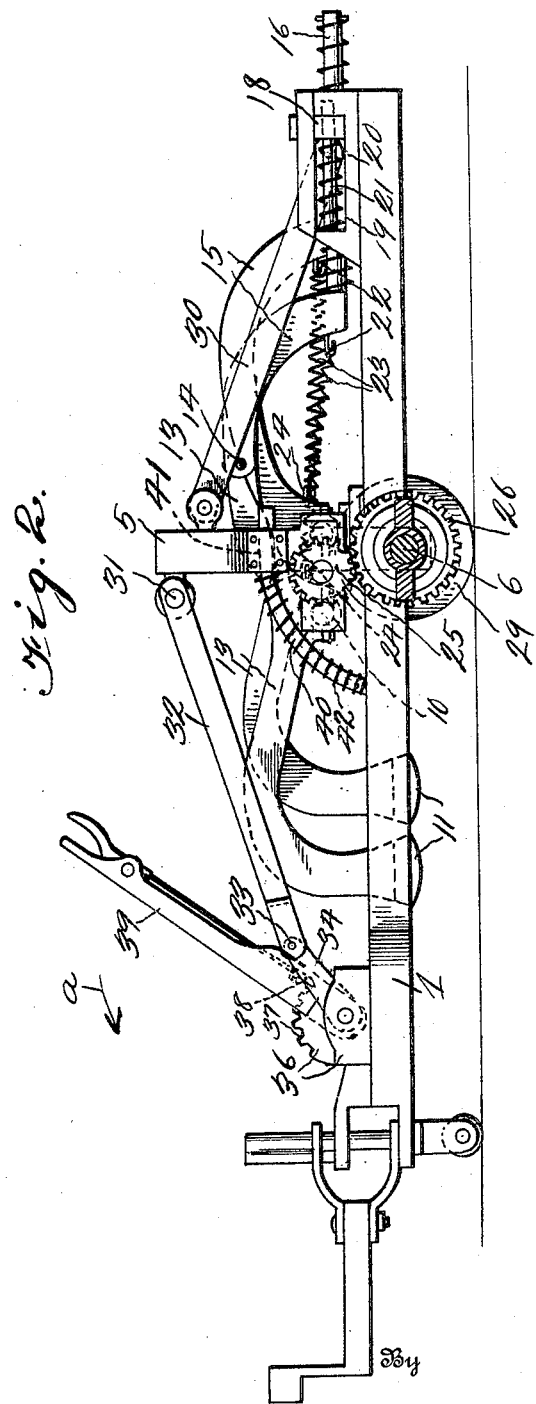

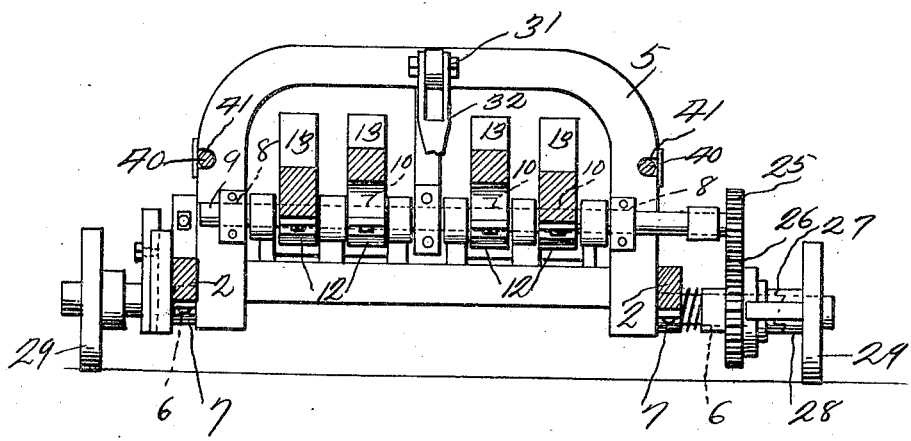
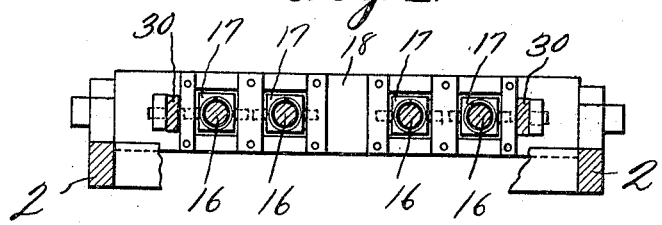

PEDER SKONSENG, OF ENGLEVALE, NORTH DAKOTA.

PULVERIZER AND PACKER.

1,404,801.  Specification of Letters Patent.  Patented Jan. 31, 1922.

Application filed April 5, 1921. Serial No. 458,666.

*To all whom it may concern:*

Be it known that I, PEDER SKONSENG, a citizen of the United States, residing at Englevale, in the county of Ransom, State of North Dakota, have invented a new and useful Pulverizer and Packer; and I do hereby declare the following to be a full, clear, and exact description of the invention, such as will enable others skilled in the art to which it appertains to make and use the same.

The invention relates to pulverizers and packers, and has for its object to provide a device of this character which may be trailed behind a plow and so constructed that the soil will be thoroughly pulverized adjacent the surface of the ground and packed below the surface of the ground.

A further object is to provide a pulverizer and packer comprising a wheel supported frame, a transversely disposed crank shaft rotatively mounted in bearings of a U-shaped member pivoted to said frame and a plurality of longitudinally disposed digging elements carried by the cranks of the crank shaft, which digging elements are forced into the ground for pulverizing and packing the ground when the crank shaft is rotated.

A further object is to provide the rear ends of the digging arms with cylindrical portions extending through pivoted bearings in a horizontally slidable member which is normally held rearwardly by coiled springs. Also to provide the cylindrical portions with coiled springs disposed on each side of the horizontally slidable member and forming means for preventing rattling of the parts during the operation of the digging elements. Also assisting the digging element during the rotation of the crank shaft.

A further object is to provide lever means whereby the U-shaped pivoted member may be inclined forwardly for positioning the forward ends of the digging elements in relation to the forward end of the frame, and to provide link connections between said U-shaped member and the horizontally slidable member carried at the rear end of the frame, which horizontal member carries the pivoted bearings for the cylindrical portions of the digging beams. Also to provide spring means for normally holding the U-shaped frame in vertical position.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of the pulverizer and packer.

Figure 2 is a longitudinal sectional view taken on line 2—2 of Figure 1, looking in the direction of the arrows.

Figure 3 is a transverse sectional view taken on line 3—3 of Figure 1.

Figure 4 is a transverse sectional view taken on line 4—4 of Figure 1.

Referring to the drawings, the numeral 1 designates the frame of the machine and 2 the side rails thereof. The rails 2 are connected together at their forward ends by transversely disposed member 3, which member may be secured to a conventional form of plow in any suitable manner. The rear ends of the side rails 2 are connected together by means of a transversely disposed bar 4. It will be seen that a rigid frame is formed. The device as a whole is adapted to be trailed behind a plow of any type, whether a single, gang, or wheeled one. The particular function of the device is that after the soil has been plowed, a plurality of digging elements are intermittently forced into the plowed ground thereby pulverizing the soil adjacent the surface of the ground and packing the soil below the surface of the ground. All of the operations are accomplished substantially at the same time, thereby obviating the necessity of going over the ground after it has been plowed for the pulverizing operation.

Pivotally mounted substantially centrally of the frame 1 and transversely disposed thereon is a U-shaped frame 5, the arms of which extend downwardly between the side rails 2 of the frame 1, and are provided with outwardly extending shafts 6, which shafts are rockably mounted in bearings 7 of the side rails 2. It will be seen that the U-shaped frame 5 may be tilted forwardly on its shaft 6 as pivotal points, the purpose of which will presently appear. Rotatively mounted in bearings 8 of the arms of the U-shaped frame 5 is a transversely disposed crank shaft 9, which crank shaft is provided with a plurality of cranks 10. Cranks 10 may be arranged in relation to each other in any position desired, however, they are preferably oppositely disposed as shown in Figure 1, thereby being so arranged that the digging elements 11 will be forced into the ground intermittently in gangs. The digging elements 11 are pivotally mounted on the cranks 10 by means of bearings straps 12, and as the crank shaft rotates, the digging elements will be raised and lowered according to the positions of the cranks on the crank shaft. The digging elements 11 comprise beams 13 which extend across the crank shaft and have hingedly connected at 14 to their rear ends rearwardly and downwardly extending members 15, which members are provided with rearwardly extending shafts 16 which are slidable mounted in pivoted bearings 17. The bearings 17 are pivotally mounted in a transversely disposed bar 18, the ends of which are slidably mounted in elongated slots 19 in the rear ends of the side rails 2 of the frame. Bar 18 is normally held in its rearmost position as shown in Figures 1 and 2 by coiled springs 20, which springs surround guide shafts 21 disposed in the elongated apertures 19. It will be seen that as the crank rotates that the pivoted bearings 17 will pivot in a vertical plane, thereby allowing the beams 13 to move in vertical planes, in such a manner that the digging elements carried thereby will be forced into the ground as the cranks 10 move downwardly. Connected to the rear ends of the members 15 as at 22 are coiled springs 23, which coiled springs are in turn connected as at 24 to the rear ends of the beams 13. By so connecting the coiled springs it will be seen that said coiled springs during a digging operation when the digging elements are forced into the ground will when any of the said digging elements come into engagement with any obstruction in the ground be stretched, thereby preventing damage to the mechanism.

Secured to one end of the crank 9 is a gear 25, which gear meshes with a gear 26 carried by a clutch sleeve rotatively mounted on one of the shafts 6, said clutch sleeve being normally maintained in interengagement at 27 with a clutch member 28 carried by one of the supporting wheels 29 of the machine. It will be seen that as the ground engaging wheel 29 rotates that the crank shaft 9 will simultaneously rotate through the medium of the gears 25 and 26. However, upon a backward movement of the machine, the clutch sleeve and clutch element will cam out of engagement with each other, thereby preventing rotation of the crank shaft 9.

The slidable bar 18 if connected to the U-shaped frame 5 by means of links 30 and said links in connection with the slidable bar and rear ends of the elongated slots 19 limit the rearward movement of the U-shaped frame 5 and prevent said frame from passing beyond a vertical position in its rearward movement. When the frame is in vertical position as shown in Figure 1 the digging elements are in raised position and the machine as a whole may be transported from place to place without the digging elements coming into engagement with the ground; therefore, it will be seen that roads will not be destroyed when the machine is being transported from place to place. Pivotally connected at 31 on the forward side of the U-shaped frame 5 is a connecting rod 32, which connecting rod has its forward end pivotally connected at 33 to an upwardly and rearwardly extending arm 34, which arm is carried by a rockable member 35, rockably mounted in brackets 36. One of the brackets 36 is provided with a segmental rack 37, with which rack a pawl 38 cooperates, said pawl being carried by an operating lever 39. It will be seen that when operating lever 39 is moved in the direction of the arrow "A" that the U-shaped frame 5 will be forced forward and consequently the crank shaft 9 lowered, thereby allowing the digging elements 11 during the rotation of the crank shaft to be forced into the ground for pulverizing the same and for packing the soil at a point below the surface thereof. Extending upwardly and rearwardly from the side rails 2 of the frame are guide rods 40, which guide rods are concentric with the pivotal point of the frame 5 and are slidably mounted in the bearings 41 of the arms of the frame 5. Disposed on the guide rods 40 are coiled springs 42, which coiled springs when the U-shaped frame 5 is pushed forwardly or compressed are held in compressed condition by the operating lever 39. When the operating lever 39 is released the coiled springs 42 in connection with the coiled springs 20 force the U-shaped frame 5 to a vertical position and consequently relieve the operator of the weight of the beams during a raising operation.

From the above it will be seen that a pulverizer is provided which is crank operated and one which may be towed behind a gang or other plow in such a manner that the ground after the same has been plowed will be thoroughly pulverized. Also a pulverizer wherein the beams are provided with break joints, which break joints when any of the digging elements come into engagement with an obstruction will break, thereby preventing damage to the mechanism of the machine.

The invention having been set forth, what is claimed as new and useful is:

1. A pulverizer comprising a frame, wheels for supporting said frame, a transversely disposed crank shaft carried by said frame and provided with a plurality of cranks, beams longitudinally disposed above said crank shaft and connected to the cranks thereof, the rear ends of said beams being slidably mounted in vertically pivoted bearings, the forward ends of said beams terminating in downwardly extending digging elements.

2. A pulverizer comprising a frame supported on wheels, an upwardly extending U-shaped frame having its lower end pivotally connected to the frame, a crank shaft carried by said upwardly extending pivoted frame at a point above its pivotal point, a plurality of beams disposed above the crank shaft and connected to the cranks thereof, the forward ends of said beams extending downwardly and terminating in digging elements, the rear ends of said beams terminating in rearwardly extending shafts, a transversely disposed bar carried by the frame and provided with vertically pivoted bearing blocks, the rearwardly extended shafts being slidably mounted in the vertically pivoted bearing blocks, spring means for normally maintaining the U-shaped frame in vertical position and lever means whereby the U-shaped frame may be tilted forwardly and the transverse bar simultaneously moved forwardly.

3. A pulverizer comprising a frame supported on wheels, an upwardly extending U-shaped frame having its lower end pivotally connected to the frame, a crank shaft carried by said upwardly extending pivoted frame at a point above its pivotal point, a plurality of beams connected to the crank shaft cranks, the forward ends of said beams terminating in downwardly extending digging elements, the rear ends of the beams terminating in rearwardly extending shafts slidably mounted in vertically pivoted bearings, the rear portions of the beams being provided with break joints whereby the forward ends of the beams may move upwardly upon engaging an obstruction, spring means for normally maintaining the beams in a raised position, and means whereby the U-shaped frame may be pivoted forwardly and held in forward position.

4. A pulverizer comprising a wheel supported frame, a crank shaft transversely disposed on said frame and provided with a plurality of cranks, beams connected to said cranks and provided with digging elements, said beams being so disposed and slidably mounted in bearings of the frame that when the cranks are rotated the digging element ends of the beams will be moved downwardly, rearwardly, and upwardly.

5. A pulverizer comprising a wheel supported frame, an upwardly extending frame pivoted to said wheel supported frame, a crank shaft rotatively mounted in bearings of the upwardly extending frame and provided with a plurality of cranks, beams pivotally connected to said cranks, the forward ends of said beams being provided with downwardly extending digging elements, the rear ends of said beams being slidably mounted in pivoted and movable bearings, and means whereby the upwardly extending frame may be inclined forwardly as desired.

In testimony whereof I have signed my name to this specification in the presence of two subscribing witnesses.

PEDER SKONSENG.

Witnesses:
 HENRY JOHNSON,
 CARRIE J. LOVELACE.